(12) United States Patent
Bugenhagen

(10) Patent No.: US 9,736,230 B2
(45) Date of Patent: *Aug. 15, 2017

(54) USER CONTROL OVER CONTENT DELIVERY

(71) Applicant: CenturyLink Intellectual Property LLC, Denver, CO (US)

(72) Inventor: Michael K. Bugenhagen, Leawood, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/996,904

(22) Filed: Jan. 15, 2016

(65) Prior Publication Data

US 2016/0134688 A1  May 12, 2016

Related U.S. Application Data

(63) Continuation of application No. 14/659,316, filed on Mar. 16, 2015, now Pat. No. 9,300,732, which is a
(Continued)

(51) Int. Cl.
*G06F 15/16* (2006.01)
*H04L 29/08* (2006.01)
(Continued)

(52) U.S. Cl.
CPC .............. *H04L 67/10* (2013.01); *G08B 25/08* (2013.01); *G08B 25/14* (2013.01);
(Continued)

(58) Field of Classification Search
CPC ..... H04L 67/10; H04L 45/74; H04L 41/0896; H04L 67/02; H04L 67/06; H04L 67/20;
(Continued)

(56) References Cited

U.S. PATENT DOCUMENTS 5,774,859 A  6/1998  Houser
5,945,910 A  8/1999  Gorra
(Continued)

OTHER PUBLICATIONS

U.S. Appl. No. 13/926,475; Non-Final Rejection dated Jun. 6, 2016; 22 pages.
(Continued)

*Primary Examiner* — Cheikh Ndiaye
(74) *Attorney, Agent, or Firm* — Swanson & Bratschun, L.L.C.

(57) ABSTRACT

Novel tools and techniques for Internet service providers to enable enhanced user control over content delivery. In an aspect of certain embodiments, these tools can allow the customer to select, on a variety of different bases, whether content should be obtained from the Internet or from a lower-cost source, such as a metropolitan content delivery network ("CDN") operated by the ISP or a private peering connection with a content source. Both of these options can, for example, avoid accessing content over the Internet and thus can reduce ISP delivery costs. In some embodiments, these cost reductions can be passed to the consumer in the way the ISP accounts for the content delivery.

19 Claims, 4 Drawing Sheets

Related U.S. Application Data continuation of application No. 13/302,055, filed on Nov. 22, 2011, now Pat. No. 9,015,343.

(60) Provisional application No. 61/481,282, filed on May 2, 2011, provisional application No. 61/435,056, filed on Jan. 21, 2011, provisional application No. 61/429,866, filed on Jan. 5, 2011, provisional application No. 61/416,600, filed on Nov. 23, 2010.

(51) Int. Cl.
*G08B 25/08* (2006.01)
*G08B 25/14* (2006.01)
*H04L 12/741* (2013.01)
*H04L 12/24* (2006.01)

(52) U.S. Cl.
CPC .......... *H04L 41/0896* (2013.01); *H04L 45/74* (2013.01); *H04L 67/02* (2013.01); *H04L 67/06* (2013.01); *H04L 67/20* (2013.01)

(58) Field of Classification Search
CPC ....... H04L 29/08; H04L 12/24; H04L 12/741; G08B 25/08; G08B 25/14
See application file for complete search history.

(56) References Cited

U.S. PATENT DOCUMENTS

| | | | |
|---|---|---|---|
| 6,020,884 A | 2/2000 | MacNaughton et al. | |
| 6,385,302 B1 | 5/2002 | Antonucci et al. | |
| 6,397,186 B1 | 5/2002 | Bush et al. | |
| 6,826,168 B2 | 11/2004 | Galyas et al. | |
| 6,889,339 B1 | 5/2005 | D'Amico et al. | |
| 7,043,660 B1 | 5/2006 | Bolar | |
| 7,233,781 B2 | 6/2007 | Hunter et al. | |
| 7,477,603 B1 | 1/2009 | Pandian | |
| 7,623,647 B1 | 11/2009 | Croak et al. | |
| 7,756,913 B1* | 7/2010 | Day | H04L 67/306 707/821 |
| 7,860,964 B2 | 12/2010 | Stolorz et al. | |
| 7,903,553 B2 | 3/2011 | Liu | |
| 8,230,081 B2 | 7/2012 | Roberts et al. | |
| 8,412,147 B2 | 4/2013 | Hunter et al. | |
| 8,489,731 B2 | 7/2013 | Gagliardi et al. | |
| 8,561,122 B2 | 10/2013 | Kirk et al. | |
| 8,639,214 B1 | 1/2014 | Fujisaki | |
| 8,804,720 B1 | 8/2014 | Rainovic et al. | |
| 8,873,717 B2 | 10/2014 | Bugenhagen | |
| 8,896,707 B2 | 11/2014 | Dhaliwal et al. | |
| 9,013,996 B2 | 4/2015 | Cook | |
| 9,015,343 B2 | 4/2015 | Bugenhagen | |
| 9,300,732 B2 | 3/2016 | Bugenhagen | |
| 2001/0039585 A1* | 11/2001 | Primak | H04L 29/12066 709/228 |
| 2002/0057297 A1* | 5/2002 | Grimes | G06F 17/30867 715/810 |
| 2002/0136231 A1 | 9/2002 | Leatherbury et al. | |
| 2002/0140741 A1 | 10/2002 | Felkey et al. | |
| 2003/0020764 A1 | 1/2003 | Germain et al. | |
| 2003/0137938 A1 | 7/2003 | Belanger | |
| 2003/0188017 A1* | 10/2003 | Nomura | H04L 12/14 709/241 |
| 2003/0231635 A1 | 12/2003 | Kalkunte et al. | |
| 2004/0088403 A1 | 5/2004 | Aggarwal | |
| 2004/0196842 A1 | 10/2004 | Dobbins | |
| 2004/0208133 A1 | 10/2004 | Jay et al. | |
| 2004/0261116 A1 | 12/2004 | Mckeown et al. | |
| 2005/0160154 A1 | 7/2005 | Raciborski et al. | |
| 2005/0160164 A1* | 7/2005 | Benfield | G06F 17/2229 709/223 |
| 2006/0013367 A1 | 1/2006 | Sawyer et al. | |
| 2006/0064729 A1 | 3/2006 | Steading | |
| 2006/0143293 A1 | 6/2006 | Freedman et al. | |
| 2006/0245364 A1 | 11/2006 | Zhu et al. | |
| 2006/0285500 A1 | 12/2006 | Booth et al. | |
| 2007/0025237 A1 | 2/2007 | Goto | |
| 2007/0064604 A1 | 3/2007 | Chen et al. | |
| 2007/0104227 A1 | 5/2007 | Rivera | |
| 2007/0107034 A1 | 5/2007 | Gotwals | |
| 2007/0263798 A1 | 11/2007 | Dewing et al. | |
| 2008/0021598 A1 | 1/2008 | Daude et al. | |
| 2008/0059188 A1 | 3/2008 | Konopka et al. | |
| 2008/0089237 A1 | 4/2008 | Molen et al. | |
| 2008/0152126 A1 | 6/2008 | Pitkamaki et al. | |
| 2008/0220810 A1 | 9/2008 | Landschaft et al. | |
| 2008/0295131 A1 | 11/2008 | Grover et al. | |
| 2009/0013398 A1 | 1/2009 | Cookmeyer et al. | |
| 2009/0116379 A1 | 5/2009 | Rahman | |
| 2010/0053337 A1 | 3/2010 | Kirk et al. | |
| 2010/0100629 A1 | 4/2010 | Raciborski et al. | |
| 2010/0246436 A1 | 9/2010 | Yang et al. | |
| 2010/0257264 A1 | 10/2010 | Assadzadeh | |
| 2010/0299199 A1 | 11/2010 | Kang | |
| 2012/0084423 A1* | 4/2012 | McGleenon | H04L 61/1511 709/223 |
| 2012/0126976 A1 | 5/2012 | Bugenhagen | |
| 2012/0131096 A1 | 5/2012 | Bugenhagen | |
| 2012/0131466 A1 | 5/2012 | Bugenhagen | |
| 2012/0204201 A1* | 8/2012 | Cassidy | H04N 21/258 725/10 |
| 2012/0224572 A1 | 9/2012 | Mody et al. | |
| 2012/0250491 A1 | 10/2012 | Goodson et al. | |
| 2012/0311638 A1* | 12/2012 | Reyna | H04N 21/47 725/52 |
| 2013/0241726 A1 | 9/2013 | Hunter et al. | |
| 2013/0290900 A1 | 10/2013 | Younger et al. | |
| 2013/0294377 A1 | 11/2013 | Quigley et al. | |
| 2013/0308453 A1 | 11/2013 | Cook | |
| 2014/0300757 A1 | 10/2014 | Dhaliwal et al. | |
| 2015/0172217 A1 | 6/2015 | Cook | |
| 2015/0195351 A1 | 7/2015 | Bugenhagen | |

OTHER PUBLICATIONS

U.S. Appl. No. 13/302,051, Final Rejection dated May 19, 2016; 23 pages.

U.S. Appl. No. 13/302,051, filed Nov. 22, 2011 by Michael K. Bugenhagen, and entitled, "User-Based Monitoring and Control;" 41 pages.

U.S. Appl. No. 13/302,051, Final Rejection dated Jan. 2, 2015; 20 pages.

U.S. Appl. No. 13/302,051, Final Rejection dated Aug. 20, 2015; 23 pages.

U.S. Appl. No. 13/302,051, Non-Final Office Action dated Apr. 9, 2014; 6 pages.

U.S. Appl. No. 13/302,051, Non-Final Office Action dated Aug. 1, 2014; 24 pages.

U.S. Appl. No. 13/302,051, Non-Final Rejection dated Jan. 29, 2016; 22 pages.

U.S. Appl. No. 13/302,051, Non-Final Rejection dated Apr. 30, 2015; 21 pages.

U.S. Appl. No. 13/302,053, filed Nov. 22, 2011 by Michael K. Bugenhagen, and entitled, "Emergency Alert Signaling;" 45 pages.

U.S. Appl. No. 13/302,053, Notice of Allowance dated Jun. 26, 2014; 21 pages.

U.S. Appl. No. 13/302,053, Issue Notification dated Oct. 8, 2014; 1 page.

U.S. Appl. No. 13/302,055; Final Rejection dated Aug. 26, 2014; 30 pages.

U.S. Appl. No. 13/302,055; Issue Notification dated Apr. 1, 2015; 1 page.

U.S. Appl. No. 13/302,055; Non-Final Rejection dated Jan. 6, 2014; 42 pages.

U.S. Appl. No. 13/302,055; Notice of Allowance dated Dec. 19, 2014; 21 pages.

U.S. Appl. No. 13/302,055, filed Nov. 22, 2011 by Michael K. Bugenhagen, and entitled, "User Control Over Content Delivery;" 40 pages.

(56) References Cited

OTHER PUBLICATIONS

U.S. Appl. No. 13/473,326; Issue Notification dated Apr. 1, 2015; 1 page.
U.S. Appl. No. 13/473,326; Non-Final Rejection dated Oct. 23, 2014; 40 pages.
U.S. Appl. No. 13/473,326; Notice of Allowance dated Nov. 25, 2014; 32 pages.
U.S. Appl. No. 13/926,475; Final Rejection dated Jan. 14, 2016; 21 pages.
U.S. Appl. No. 13/926,475; Non-Final Rejection dated Jul. 16, 2015; 33 pages.
U.S. Appl. No. 14/159,314; Issue Notification dated Nov. 5, 2014; 1 page.
U.S. Appl. No. 14/159,314; Non-Final Rejection dated Apr. 11, 2014; 14 pages.
U.S. Appl. No. 14/159,314; Notice of Allowance dated Jul. 24, 2014; 14 pages.
U.S. Appl. No. 14/659,316; Issue Notification dated Mar. 9, 2016; 1 page.
U.S. Appl. No. 14/659,316; Notice of Allowance dated Sep. 14, 2015; 31 pages.
U.S. Appl. No. 13/302,051, Non-Final Rejection dated Sep. 30, 2016; 23 pages.
U.S. Appl. No. 13/926,475; Final Rejection dated Oct. 20, 2016; 31 pages.
U.S. Appl. No. 13/302,051; Final Rejection dated Feb. 3, 2017; 24 pages.
U.S. Appl. No. 13/926,475; Non-Final Rejection dated May 24, 2017; 21 pages.

* cited by examiner

Content Delivery Preferences

Local Content

Max. Localized Service (no bandwidth cap)
- ☑ Everything possible — 310a

*315*

Content Source Type (no bandwidth cap)
- ☑ Video on Demand — 310b
- ☑ TV Broadcast — 310c
- ☑ Special Channels — 310d
- ☑ Game Servers — 310e

*320*

Organization Local Source (no bandwidth cap)
- ☑ Hulu™ — 310f
- ☑ Netflix™ — 310g
- ☑ Disney™ — 310h
- ☑ ESPN™ — 310i
- ☑ XBox™ Games — 310j

*325*

Single Site Mapping (no bandwidth cap)
- ☑ ESPN™ Hockey — 310k
- ☑ ESPN™ Football — 310l
- ☑ ESPN™ Baseball — 310m
- ☑ ESPN™ Boxing — 310n

*330*

*305*

Statistics

Internet Usage (current month): 345 MB
Local Content Usage (current month): 2043 MB ☒ Internet Content
☐ Local Content

USER CONTROL OVER CONTENT DELIVERY

CROSS-REFERENCES TO RELATED APPLICATIONS

The present disclosure may be related to the following commonly assigned applications/patents:

This application is a continuation of U.S. patent application Ser. No. 14/659,316 filed Mar. 16, 2015 by Michael K. Bugenhagen and titled, "User Control Over Content Delivery", which is a continuation of U.S. patent application Ser. No. 13/302,055 (now U.S. Pat. No. 9,015,343, filed Nov. 22, 2011 by Michael K. Bugenhagen and titled, "User Control Over Content Delivery", which claims the benefit, under 35 U.S.C. §119(e), from the following provisional applications, the entire disclosure of each of which is hereby incorporated by reference, as if set forth in full in this document, for all purposes: provisional U.S. Patent Application No. 61/416,600, filed Nov. 23, 2010, by Michael K. Bugenhagen and titled "Line Performance Metrics Customer Service Point"; provisional U.S. Patent Application No. 61/429,866 filed Jan. 5, 2011, by Michael K. Bugenhagen and titled "Line Performance Metrics Customer Service Point"; provisional U.S. Patent Application No. 61/435,056 filed Jan. 21, 2011, by Michael K. Bugenhagen and titled "Access Control"; and provisional U.S. Patent Application No. 61/481,282 filed May 2, 2011, by Michael K. Bugenhagen and titled "Communications Path State Machine."

The respective disclosures of these applications/patents are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to computer networks, and more particularly, to tools and techniques for providing customers of an Internet service provider with enhanced monitoring and control over their Internet connections.

BACKGROUND

Broadband Internet access has become nearly ubiquitous in most industrialized countries. Internet service providers ("ISP") employ a variety of technologies, including without limitation digital subscriber line ("xDSL") technologies, cable more (e.g., "DOCSIS") technologies, wireless broadband technologies, and the like. In most cases, broadband access is offered using a tiered structure, in which the subscriber (referred to herein as a "customer") receives a certain allocated bandwidth in return for a given fee (such as a monthly flat fee).

As use of the Internet as a content resource has grown, demands on ISPs have grown. For example, many customers regularly access streaming video and other bandwidth-intensive content using their broadband connections. This increased demand for bandwidth through the provider's network to the Internet has taxed ISP resources. One solution providers have attempted to implement is the use of "local" content delivery networks and/or peering relationships with other providers to deliver the customer's requested content. Other providers have attempted to charge differential rates based on customer usage of bandwidth to the Internet. Societal and regulatory pressures such as the "net neutrality" movement, however, have largely prevented this sort of solution by ISPs.

As a result, both ISPs and customers are left with suboptimal options. The higher costs borne by ISPs to deliver high bandwidth content eventually are passed on to customers, raising customer rates and decreasing customer satisfaction. Accordingly, there is a need for solutions that comply with "net neutrality" obligations but still allow customers flexibility in choosing content delivery options.

BRIEF SUMMARY

Certain embodiments, therefore, provide tools and techniques for ISPs to enable enhanced user control over content delivery. In an aspect of certain embodiments, these tools can allow the customer to select, on a variety of different bases, whether content should be obtained from the Internet or from a lower-cost source, such as a metropolitan content delivery network ("CDN") operated by the ISP or a private peering connection with a content source. Both of these options can, for example, avoid accessing content over the Internet and thus can reduce ISP delivery costs. In some embodiments, these cost reductions can be passed to the consumer in the way the ISP accounts for the content delivery.

In an aspect of some embodiments, the ISP can provide a user interface to allow the customer to select options for content delivery. Based on the customer's input on how content should be obtained, the system might modify routing records to accommodate the customer's preferences. When the system receives a request from the customer for a set of content, the system might route the request according to those routing records (e.g, to the original content source on the Internet or to an alternative, lower-cost source). The content can then be delivered to the customer from the selected source. Certain embodiments might also provide a content provider portal, which can allow content providers to configure how content should be provided from a private peering connection and/or from a CDN operated by the ISP.

The tools provided by various embodiments include, without limitation, methods, systems, and/or software products. Merely by way of example, a method might comprise one or more procedures, any or all of which are executed by a computer system. Correspondingly, an embodiment might provide a computer system (which can include, but is not limited to a gateway) configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a system for delivering content, in accordance with one set of embodiments might comprise a computer system (which might be implemented by a customer service point). The computer system, in an aspect, might comprise one or more processors a computer readable medium in communication with the one or more processors. In an aspect, the computer readable medium can have encoded thereon a set of instructions executable by the computer system to perform one or more operations.

Merely by way of example, in one embodiment, the set of instructions comprises instructions for providing a user interface for the subscriber to select whether a set of content should be obtained through an Internet drain of the ISP or from a content delivery network ("CDN") associated with the ISP. The set of instructions might further comprise instructions for updating one or more routing records within an ISP network to correspond with the subscriber's selection.

In a set of embodiments, the system further comprises a network device in the ISP network. In an aspect, the network device might be configured to receive a request from the subscriber for the set of content and route the request from the subscriber in accordance with the updated one or more routing records. The network device might be further configured to deliver the set of content to the subscriber, in response to the request.

A method of delivering content, in accordance with another embodiment, might comprise providing, with a computer system, a user interface for the subscriber to select whether a set of Internet content should be obtained through an Internet drain of the ISP or from a content delivery network ("CDN") associated with the ISP. The method might further comprise updating one or more routing records within an ISP network to correspond with the subscriber's selection. In some embodiments, the method comprises receiving, at the ISP network, a request from the subscriber for the set of content. In an aspect, the method can comprise routing the request from the subscriber in accordance with the updated one or more routing records, and/or delivering the set of content to the subscriber, via the ISP network, in response to the request. In an aspect, the underlying routing and/or sourcing capability of the tools and techniques described herein can allow resource resolution and routing to be directed by a record that uses customer address and content type, which facilitates content delivery with quality of service marking or network treatments as well.

An apparatus, in accordance with another set of embodiments, might comprise a computer readable medium having encoded thereon a set of instructions executable by one or more computers to perform one or more operations. The set of instructions might comprise instructions for providing a user interface for the subscriber to select whether a set of Internet content should be obtained through an Internet drain of the ISP or from a CDN associated with the ISP. The set of instructions might further comprise instructions for updating one or more routing records within an ISP network to correspond with the subscriber's selection, such that a request from the subscriber for the set of Internet content is routed in accordance with the one or more routing records and delivered to the subscriber in response to the request.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 3 is an exemplary screen display illustrating a user interface for providing user control over content delivery, in accordance with various embodiments.

DETAILED DESCRIPTION OF CERTAIN EMBODIMENTS

Figure 1:
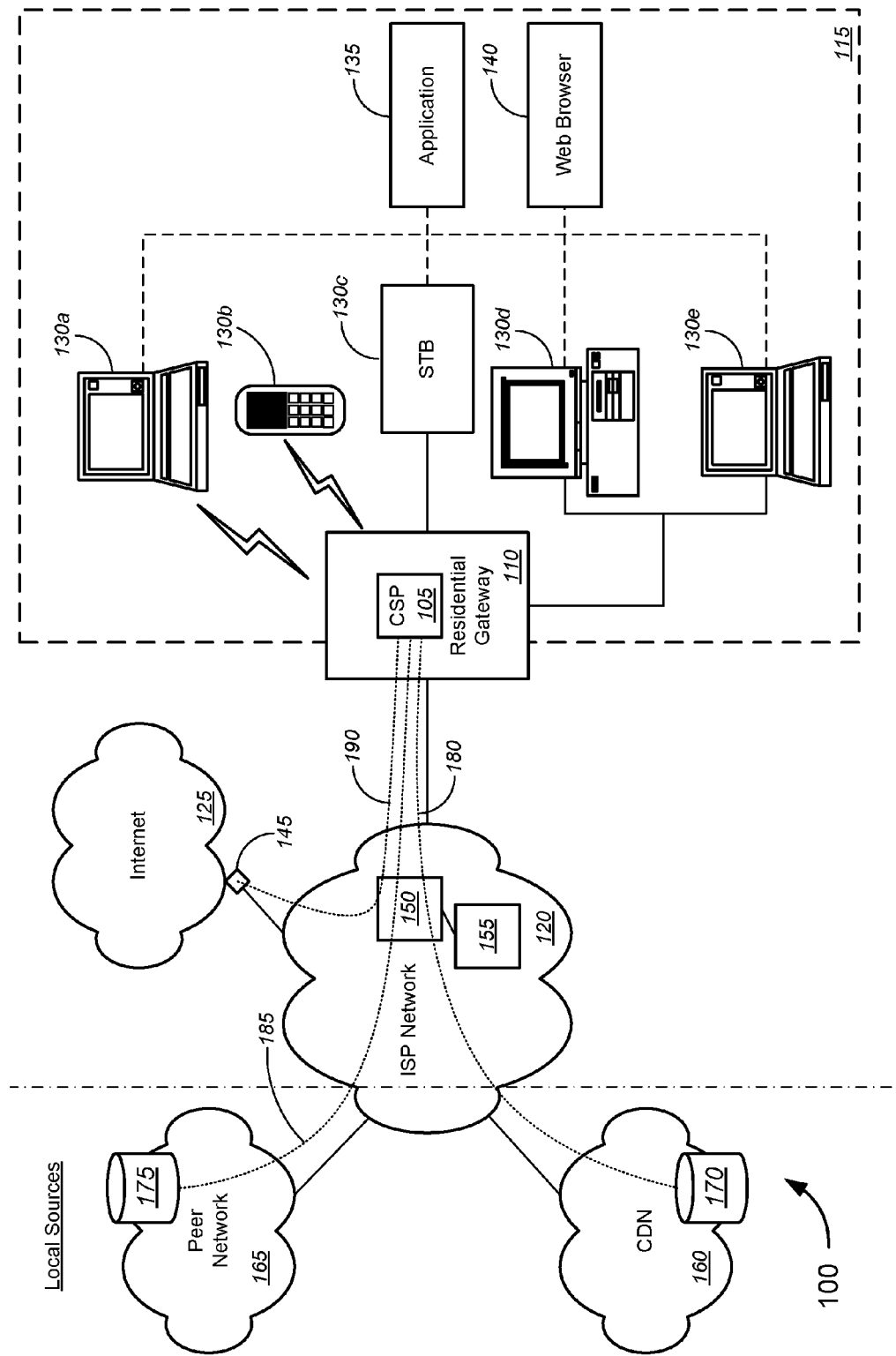
FIG. 1 is a block diagram illustrating a system for providing user control over content delivery, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Certain embodiments provide tools and techniques for ISPs to enable enhanced user control over content delivery. In an aspect of certain embodiments, these tools can allow the customer to select, on a variety of different bases, whether content should be obtained from the Internet or from a lower-cost source, such as a metropolitan content delivery network ("CDN") operated by the ISP or a private peering connection with a content source. Both of these options can, for example, avoid accessing content over the Internet and thus can reduce ISP delivery costs. This functionality can also enable both the content and content delivery in terms of quality of service treatment to be controllable by a single policy engine, which can be controlled by the customer to provide seamless end-to-end control of content and user experience. Merely by way of example, U.S. patent application Ser. No. 13/302,051, filed on Nov. 22, 2011 by Bugenhagen and titled "User-Based Monitoring and Control,", which is incorporated herein by reference in its entirety, discloses tools and techniques for providing users with control over an Internet connection, including control over various class of service parameters and assignments. The tools and techniques disclosed by that application can be implemented together in the same customer signaling point (described therein as a customer service point) as the tools and techniques described herein with respect to user control over content delivery.

In some embodiments, these cost reductions can be passed to the consumer in the way the ISP accounts for the content delivery. For example, the ISP might charge a per-bit fee for content delivered from the Internet and a flat fee for content obtained from a lower-cost source. Alternatively and/or additionally, the ISP might charge a first fee (e.g., a per-bit fee) for content obtained from the Internet and a second fee (e.g., a second per-bit fee) for content obtained from a lower-cost source.

In an aspect of some embodiments, the ISP can provide a user interface to allow the customer to select options for content delivery. Merely by way of example, the user interface might enable the customer to select, based on the type of content, the source of content, etc., whether the content should be obtained from the Internet or from a lower-cost source, via the user of a user-configurable policy control server, service gateway, and/or modifiable DNS service (which can be implemented as a customer-facing customer service point, for example). In other cases, the user interface might allow the customer to indicate that all content should be obtained from the lower-cost source (when possible) or from the Internet.

Based on the customer's input on how content should be obtained, the system might modify routing records, and/or quality of service markings, to accommodate the customer's preferences. When the system receives a request from the customer for a set of content, the system might route the request according to those routing records (e.g., to the original content source on the Internet or to an alternative, lower-cost source). The content can then be delivered to the customer from the selected source. Certain embodiments might also provide a content provider portal, which can allow content providers to configure how content should be provided from a private peering connection and/or from a CDN operated by the ISP, and/or what treatment those packets should receive on the network.

FIG. 1 illustrates a system 100 that can provide these, and other, user-based control features. The system 100 includes a customer service point 105. In some cases, as illustrated by FIG. 1, a customer service 105 point can be implemented by a residential gateway 110.

A residential gateway 110 can be any device that provides connectivity between a subscriber and a provider's network. Such devices can include, without limitation, network interface devices ("NID"), broadband modems, voiceband modems, cellular modems, wireless modems and access points, routers, other interfaces between the customer's premises network and the access network, and/or the like. Typically, the residential gateway will be located at the customer's premises, but this is not required in all embodiments. The residential gateway 110 provides connectivity between a customer network 115 and an ISP network 120 operated by an ISP, such as a broadband provider. The ISP network 120, which can comprise an access network, a core network, or both, provides, inter alia, connectivity between the customer's network 110 and the Internet 125, as is known in the art.

In a typical implementation, the residential gateway 110 will have a first communication interface (e.g., a broadband interface or an uplink interface) that communicates with the access network 120 using whatever broadband technology is employed (e.g., xDSL, DOCSIS, wireless broadband, etc.) and a second (local) communication interface that that provides connectivity with one or more customer devices (e.g., an Ethernet port, 802.11x radio, etc.). In some embodiments, the residential gateway 110 might include router functionality, such that the local communication interface might provide for communication with a plurality of devices in the customer network 115 via either wired or wireless connection. In other embodiments, the residential gateway 110 might provide a single local interface, and/or local router functionality might be implemented by a separate device. The nature of the customer's network 115 topology are not material to the scope of various embodiments.

In other cases, a customer service point 105 might be located at a device (not shown on FIG. 1) in the ISP network 120 itself and/or it might be configured to communicate with the customer's residential gateway 110 or network interface device, and/or any customer devices 130 on the customer premises network. The customer service point 105, in different embodiments, can be located at any location (or integrated with any device) that provides the customer service point 105 with visibility into the configuration and/or performance of the network, as described herein, and/or allows for configuration of network parameters, as described herein. Thus, in some cases, the customer service point 105 can be in a device separate from the residential gateway 110 and/or access network 120, so long as it can communicate with appropriate devices in the access network 120 and/or the residential gateway 110 to provide the monitoring and control services described herein.

The customer devices 130 can include any devices that are capable of network communications (and, in particular aspects, IP communications). Such devices 130 can include, without limitation a laptop 130a with wireless networking (e.g., IEEE 802.11x) capabilities, a mobile device 130b (e.g., a mobile phone, tablet computer, personal digital assistant, etc.) with wireless networking capability, a television set top box 130c, a networked personal computer 130d and/or laptop 130e, and the like. In some aspects, some (or all) of the customer devices 130 are programmed with applications 135 that access the Internet 125 (e.g., through the residential gateway 110 and/or the ISP network 120. Such applications can include, without limitation, web browsers 140, video on demand applications (such as Netflix™, to name one example), VoIP applications, online games, chat applications (including text chat, voice chat, and/or video chat applications), and any other type of application that requires, or can benefit from, a connection with the Internet. In some cases, one or more of these applications might be configured to access the customer service point at the residential gateway 105 (or elsewhere), e.g., using an application programming interface ("API"), as described in further detail below.

While a web browser 140 can be considered, in one aspect, to be one of the applications 135 that use the Internet, the web browser 140 can also independently be used to provide a user interface to the customer service point 105 at the residential gateway 110 (or elsewhere), as described in further detail below. Thus, the customer service point 105 might be programmed with, e.g., a web server, in order to serve web pages to be displayed in a browser 140 of one or more of the devices 130 for providing the user interaction described further herein. (Of course, in some embodiments, one or more of the devices 130 might be programmed with a dedicated application that interfaces with the customer service point 105 to provide similar interaction.)

The interface 145 between the ISP network 120 and the Internet 125 is commonly referred to as an "Internet drain," and content obtained by the ISP from the Internet is referred to herein as content obtained through the Internet drain. The ISP network 115 might include a network device 150, such as a router (e.g., an edge router, core router, etc.), DNS server, policy server, and/or or website, which is responsible for receiving requests from the residential gateway 110 and routing those requests to an appropriate server (or other host) to service the request. This network device might be located in the ISP network, the Internet, or elsewhere. In a typical embodiment, the server will provide content in response to the customer's request. The ISP network might also include an addressing server 155, such as a Domain Name Service ("DNS") server, a Dynamic Host Configuration Protocol ("DHCP") server, and/or the like. As is known in the art, the addressing server 155 is used to provide addressing information to resolve hostnames into IP addresses so that requests can be routed (e.g., by the network device 150) by IP address.

The addressing server 155 generally will include records correlating hostnames (or domain names) to IP addresses, and the network device generally will contain records indicating optimal routes to each of the hosts. Together, the DNS/DHCP records (or other addressing records) maintained by the addressing server 150 and the records maintained by the network device 150 can all be considered types of "routing records." (One skilled in the art will appreciate, of course, that a typical ISP network might comprise many network devices 150 and/or addressing servers 155 working together to properly route requests from a customer to the proper host.

In addition to its connection through the Internet drain 145 to the Internet 125, the ISP network 120 may be in communication with (and/or may comprise) a CDN 160. The CDN 160 might be operated by the ISP and/or might be operated by a third party. In either case, The CDN 160 might be co-located at a metropolitan data center operated by the ISP. Additionally and/or alternatively, the ISP network 120 by and have a private peering connection with a peer network 165. As is known in the art, this private peering connection can provide communication between the ISP network 120 and the peer network 125 without requiring traffic between the two networks to pass through the Internet drain 145. These alternative content sources can be considered "local" to the ISP (irrespective of their actual physical locations) because requests can be routed to these networks without passing through the Internet drain The CDN 160 might comprise a content store 170, which can store content that can be delivered to the customer via the residential gateway 110. Similarly the peer network 165 mile also comprise a content store 175 storing content that can be delivered to the customer. In either case, the content store 165 or 175 can host content that mirrors content available through the Internet drain, using caching and/or content delivery techniques that are known in the art.

The functionality of the system 100 is described in further detail below, but as a general matter, the customer service point 105 is configured to receive user input indicating whether the user would like to receive certain types of content from the Internet 125 (i.e. through the Internet drain 145) or from an alternative source, such as the content store 170 in the CDN 160 and/or the content store 175 in the peer network 165, if such content is available from one or both of those sources. Such content can include, but is not limited to, streaming or discrete audio or video files, images, web-based content, applications or other files, and/or the like.

Based on this customer input, the customer service point 105 might modify one or more routing records on the network device 150 and/or the addressing server 155. Merely by way of example, if the customer indicates that he or she would like to obtain a particular type of content from an alternative content source, the next time the customer requests content of that type, the ISP network 120 will route that request to an alternative content source, e.g. the CDN 160 (using path 180) and/or the peer network 165 (using path 185). That alternative content source will provide the requested content, and the ISP network 120 will deliver the content to the residential gateway 110, which can provide the content to one or more of the customer devices 130 for consumption (e.g., by an application 135 and/or web browser 140 running on the customer device). Alternatively, if the user specified that the content should be obtained from the Internet 125, the request would be routed through the Internet drain 145 to the appropriate location on the Internet 125 (using path 190).

In some embodiments, content located on the local service may be integrated with enhanced storage and distribution functionality such as Personal Video Recorder ("PVR"), and transparent caching that distribute content to customers based on usage patterns and or statistical usage records. Alternatively and/or additionally, the alternative content sources can be used to upload user-owned content, thereby providing a storage locker from which the customer can obtain user-owned content on other devices (or can be used to restore content after a failure of a customer device, etc.). Thus, other licensing, digital rights and PVR customer storage locker concepts can be combined with the metro CDN to create a customer storage area under joint control of the metro CDN and the customer (e.g., using the GUI/API of the customer service point).

Figure 2:
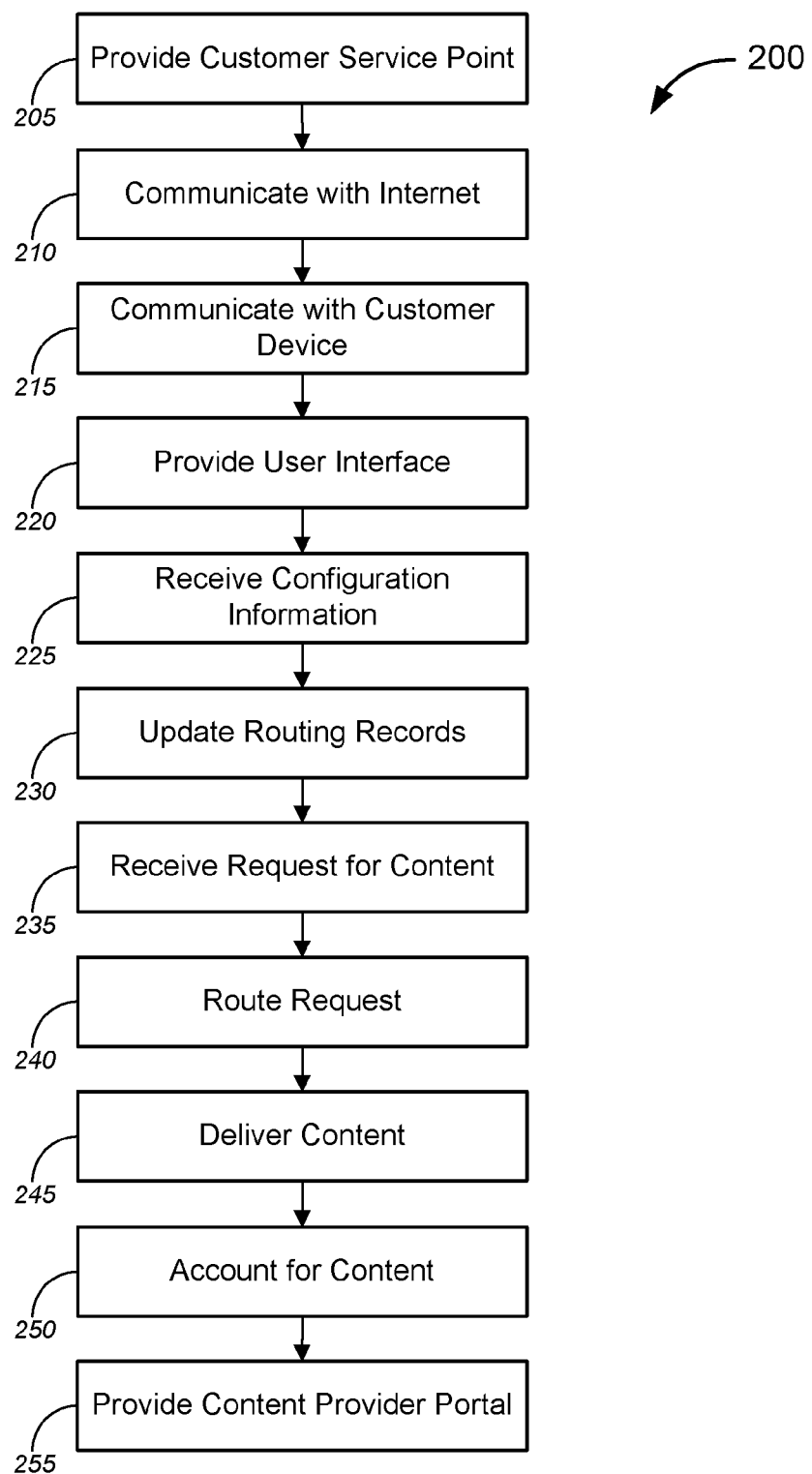
FIG. 2 is a process flow diagram illustrating a method of providing user control over content delivery, in accordance with various embodiments.

FIG. 2 illustrates a method 200 of providing user control over content delivery, in accordance with a set of embodiments. It should be noted that, while the techniques and procedures of the method 200 are depicted and/or described in a certain order for purposes of illustration, it should be appreciated that certain procedures may be reordered and/or omitted within the scope of various embodiments, and/or that operations can be added or substituted into the method 200 within the scope of various embodiments. Moreover, while (as noted above), the operations illustrated by FIG. 2 can be implemented by (and, in some cases, are described below with respect to) the system 100 of FIG. 1 (or components thereof, such as the customer service point 105), these operations can also be implemented using any suitable hardware implementation. Similarly, while the system 100 of FIG. 1 (and/or components thereof) can operate according to the method 200 illustrated by FIG. 2 (e.g., by executing instructions embodied on a computer readable medium), the system 100 can also operate according to other modes of operation and/or perform other suitable procedures.

At block 205, the method 200 comprises providing a customer service point. Providing a customer service point can involve one or more of a variety of operations. Merely by way of example, in some cases, providing a customer service point might comprise providing the customer with a residential gateway that functions as a customer service point. In other cases, providing a customer service point can comprise operating a customer service point in the access network, or providing communication between the access network and a residential gateway (or other device) to allow the residential gateway (or other device) to act as a customer service point (or an interface thereto).

The method 200 further comprises communicating with the Internet (block 210) and communicating with one or more customer devices (block 215). Merely by way of example, in a particular set of embodiments, a residential gateway (which might incorporate a customer service point) might communicate with both the Internet (e.g., via the ISP network) and a customer device, to provide connectivity between the customer device and the Internet, thereby serving as the interface between the customer and the customer's broadband connection. In an aspect, the residential gateway might have a first communication interface (e.g., an uplink port) that communicates with the Internet and a second communication interface (e.g., a wireless radio, one or more downlink ports, etc.) that communicate with a customer network, and/or one or more customer devices. The residential gateway, then, can transmit on one interface the information (e.g., IP packets) received on the other interface. In one aspect, as the information passes through the residential gateway, the residential gateway, acting as the customer service point, can perform any monitoring and/or impose any transmission control, required by the customer service point configuration. (It should be noted, of course, that such monitoring and control can also be performed at other devices, such as a DSLAM and/or a router in the access network.)

At block 220, the method comprises providing a user interface. The user interface can provide for interaction between a user (e.g., a customer, etc.) and a computer system (e.g., a customer service point). For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc.

The procedures undertaken to provide a user interface, therefore, can vary depending on the nature of the implementation; in some cases, providing a user interface can comprise displaying the user interface on a display device controlled by the customer service point; in other cases, however, in which the user interface is displayed on a device remote from the customer service point (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate customer device) might be a web interface, in which the user interface is provided through one or more web pages (and/or a web portal) that are served from the customer service point (and/or a web server in communication with the computer system), and are received and displayed by a web browser on the client computer (or other capable customer device). The web pages can display output from the customer service point and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

In many cases, providing a user interface will comprise providing one or more display screens (an example of which is described below), each of which includes one or more user interface elements. As used herein, the term "user interface element" (also described as a "visual object," "user interface mechanism," or "user interface device") means any text, image, or device that can be displayed on a display screen for providing information to a user and/or for receiving user input. Some such elements are commonly referred to as "widgets," and can include, without limitation, icons, images, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system, such as the customer service point. Hence, when this document describes procedures for displaying (or otherwise providing) information to a user, or to receiving input from a user, the user interface may be the vehicle for the exchange of such input/output. Merely by way of example, in a set of embodiments, the user interface allows the user (e.g., the customer) to provide configuration information to control content delivery options.

Thus, for instance, at block 225, the method comprises receiving (e.g., at the customer service point) configuration information. The configuration information can comprise any type of information or instructions that indicate to the customer service point how content should be delivered to the customer (or, more specifically, to the residential gateway and/or any customer devices in communication therewith). For example, the configuration information might specify, as a general matter, that all content should be obtained through the Internet drain, or that all content (at least to the extent possible) should be obtained from a metropolitan CDN, private peering arrangement, or other alternative content source. In some cases, configuration information can specify different preferences for different sets of content, for different customer devices, and/or for different customer locations. Merely by way of example, the configuration information might specify that content available from a particular host/domain/content source on the Internet should be obtained from an alternative content source if possible; thus, for instance, the user may provide configuration information that specifies that all content from Hulu.com™ should be obtained from an alternative content source, but that all other content should be obtained through the Internet drain, or that all streaming video content should be obtained from all alternative content source, but that all other content should be obtained through the Internet drain. Based on the disclosure herein, one skilled in the art can see that there are a variety of ways in which content can be categorized, and that the examples provided herein should not be considered limiting. The configuration information can be used by the customer service point to create customer sourcing policies, which can be stored at the customer service point and/or reflected in routing records (as described in further detail below).

In some cases, prior to receiving configuration information, the customer service point might authenticate the customer (or customer device) that attempts to provide the configuration information. Any of a wide variety of authentication schemes can be used to authenticate the customer and/or the customer device, either through an API or through a user interface. Examples include, but are not limited to, a conventional userid/password challenge/response system, a certificate-based system (in which the customer/customer device is provided with one or more authentication certificates, either by the system itself or by third-party certificate provider, in the system examines a certificate provided with the message to authenticate the message source), key-based authentication (such as the Kerberos protocol, which can be used to authenticate the customer or device, and/or the PGP protocol, which might be used to sign and/or encrypt the configuration information itself). Based on the disclosure herein, one skilled in the art should understand that any of a number of commercially available authentication mechanisms can be used to authenticate the customer and/or customer device.

In one aspect, the configuration information might be received via an API. Merely by way of example, a customer device, and/or an application executing on a customer device might access customer service point using the API, as described above, and provide configuration information using the API. This feature can be useful, for instance, in the context of a dedicated video streaming application, which might provide configuration information to the customer service point in order to specify the source from which content should be delivered for that application. The application/device might provide such configuration information automatically (i.e. without user input) and/or based upon user input provided to the application/customer device itself.

In another aspect, the configuration information might be received via a user interface, and in particular, via a GUI. FIG. 3 illustrates an exemplary screen display 300 that can be provided as part of a user interface to a customer service point. The exemplary screen display includes a configuration panel 305 that includes user interface elements to receive user input that provides configuration information for the customer service point. Although variety of different types of user interface screens are possible within the scope of various embodiments, the embodiment illustrated by FIG. 3 allows the user to select content delivery options for several exemplary types of content. (Other panels might be configured to receive other types of configuration information.)

The exemplary screen display 300 includes a configuration panel 305. It is worth noting that the configuration panel 305 can serve two purposes. First, the configuration panel can illustrate the current content delivery preferences of the user. Additionally and/or alternatively, the configuration panel 305 can provide an interface for the user to provide input to select a content delivery option for each type of content. For instance, in the illustrated example, the configuration panel provides a number of user interface devices 310 (in this case, checkboxes) with which the user can provide user input to indicate whether a particular type of content should be delivered from an alternative content source. Alternative content sources are reference generally in FIG. 3 as a "localized content source," which delivers "local content." As such, local content can be considered any content that is obtained by the ISP from a source other than through the Internet drain and delivered to a customer service point. Thus, examples of local content include, without limitation, content from a metropolitan CDN, content obtained through a private peering connection, and/or the like.

A number of different options for specifying local content can be supported by various embodiments. In the illustrated embodiment, for example, the configuration panel includes a subpanel 315 with a user interface device 310a for the user to specify that the ISP should attempt to obtain all possible content from a localized content source. (This option, which is a general setting, might override any content-specific settings described in further detail below.)

As illustrated, the configuration panel 305 includes a second subpanel 320, which includes options that allow the user to have local content obtained (again, when possible) for different types of content, based on the nature of the content itself. For instance the user interface includes a widget 310b to allow the user to select to have video-on-demand content obtained from a localized content source, a widget 310c to select a have broadcast television content obtained from localized content source, a widget 310d to select have special channels (which might be specialized video-on-demand channels, etc.) obtained from a localized content source, and an option 310e to have a customer service point attempt these game servers that are localized (i.e. inside the Internet drain from the perspective of the ISP). Based on these examples, one skilled in the art will appreciate that similar options could be provided for a wide variety of different types of content.

A third subpanel 325 might provide the customer with the ability to specify that content from a particular organization or entity (which might be a particular Internet domain, content provider, and/or the like) should be obtained from a localized source when possible. Merely by way of example, as illustrated, the user can select a variety of widgets 310f-j to have content from the corresponding list of providers delivered from localized sources if possible.

In some cases, embodiments can provide more granular control over the sourcing of content. Merely by way of example, on the illustrated embodiment, a fourth subpanel 330 provides the customer with a number of widgets (310k-310n) with the ability to select various types of content from a particular content provider (in this case ESPN™) to be delivered from localized sources of possible.

Thus, using such options (and/or alternative techniques, in various embodiments), the system can provide a user interface that allows the subscriber to specify that some content should be obtained through the Internet drain of the ISP and that other content should be obtained from a localized content source (such as a CDN, private peer network, etc.). As indicated above, such selections can be made for each of a plurality of types of content (e.g., data files, streaming video, video game data, video chat, and instant messaging, to name but a few examples), and/or can specify whether content of that type should be obtained through the Internet drain of the ISP or from the content delivery network ("CDN") associated with the ISP. Further, such selections can be made for different sources of content (e.g., domains, hosts, content providers, etc.), allowing the subscriber to select to have content from some sources delivered through the Internet drain and content from other sources delivered from a CDN, etc. that is below the Internet drain.

The exemplary display screen 300 might also include a statistics panel 335, which can be used to display statistics about content delivered to the residential gateway. In one aspect, as illustrated, the statistics panel 330 might display a statistic indicating how much content has been obtained from the Internet drain and another statistic indicating how much content has been obtained for alternative content source, such as the CDN, and/or a private peering network.

A number of variations are possible, of course. Merely by way of example, as shown, the statistics panel 330 illustrated by FIG. 3 can include textual statistics and/or graphical depictions of statistics, such as a pie chart, bar chart, etc., which might illustrate relative proportions of content (e.g., on a bit-by-bit basis, session-by-session basis, etc.) obtained from the Internet drain and/or from one or more alternative content sources. As another option, the statistics panel 330 might include a line chart illustrating, over time, how much content has been delivered through the Internet drain and/or from alternative content sources.

In any of these cases, the statistics panel might include statistics categorized by the nature of the content (e.g., video, files, game data, etc.) and/or content source (e.g., by domain, website, etc.) illustrating how much of each type of content has been obtained from the Internet drain and/or from alternative sources. In further cases, statistics might show (textually and/or graphically) how much allocated bandwidth the customer has used over a particular period of time (e.g., 500 MB/1000 MB used this month) and/or any bandwidth charges that have been accrued by the delivery of content from the Internet drain (or saved by the delivery of content from an alternative content source).

Referring again to FIG. 2, the method 200 can further comprise updating one or more routing records within an ISP network (block 230) to correspond with configuration information indicating the subscriber's content delivery preferences. This function can be accomplished in a variety of ways. Merely by way of example, in some cases, the customer service point might update routing information (e.g., in a route table) within the residential gateway itself, for example, to provide a default route to an alternative content source content source for any content that the customer indicates should be obtained from an alternative source, or within a router (or other network device) within the ISP network. Other possibilities exist as well.

For instance, in accordance with one set of embodiments, the ISP might employ DNS servers with specialized DNS records that reflect customer sourcing policies, and the system might update one or more sourcing policies to reflect the received configuration information/sourcing policies received from a customer service point (which might provide such updates automatically after receiving configuration information from the customer). Such sourcing policies can be reflected (or even stored) in the routing records (e.g., DNS records) themselves. Merely by way of example, in one embodiment, a standard DNS record (which might include, for example, fields for the domain name, URL, IPv4 address, and IPv6 address for each host/domain that can be resolved by that server) might be modified to include additional information to enable the system to accommodate customer preferences regarding the sourcing of content hosted on a server that could be resolved by the DNS record. Merely by way of example, the standard DNS record might include an IPv4 address and/or an IPv6 address, and/or a DNS name for a particular customer and/or a particular content source; these addresses generally would reference that server on the Internet (i.e., "above" the Internet drain). As modified, the DNS record might include an IPv4 address and/or an IPv6 address for an alternative or localized (i.e., "below" the Internet drain) content source. In an aspect, the modified DNS record might include both "above the drain" and "below the drain" addresses for a particular host or domain that can serve as a content source. In this way, the same DNS record can be used for customers who want to obtain that content from a localized source and for customers who want to obtain the content from the Internet. Thus, updating a routing record can comprise adding a customer/customer service point to a customer list in one or more DNS records, just to name one example.

In order to determine which address should be used for a particular customer, the DNS record might include additional fields as well. Merely by way of example, the DNS record (or another database record, which may be referenced by the DNS record) might include one or more customer lists. For example, a first customer list might include identifications of customers that wish to receive local content from the host/domain referenced by the DNS record, while a second customer list might include identifications of customers that wish to receive the content from the Internet. Alternatively, there may be only one list of customers, which could include identifications only of customers that wish to receive local content for that host/domain or could include identifications only of customers that wish to receive content from the Internet for that host/domain. Other possibilities exist as well.

For instance, the DNS record might include a "content status" field, which could indicate whether local content is available. The system, for example, might check periodically to ensure that local content for each host/domain remains available, and if such content becomes unavailable for some reason modify the "content status" field of the corresponding DNS record; in such a case, the DNS server might stop redirecting requests to the "below the drain" address and resolve all host/domain queries for that record to the "above the drain" address. Optionally, the system might trigger an alarm to notify a management system and/or an administrator that the content has become unavailable.

The identifications of customers can include any type of identifier that is sufficient to identify one customer from among a plurality of customers. Merely by way of example, in some cases the customer identification might be an identifier (such as an IP address, MAC address, etc.) of the customer service point associated with the customer. In other cases, the identifier could be a telephone number, e-mail address, ISP userid, etc. of the customer.

In some embodiments, the DNS record might also include a homing status field, which can indicate which customer list should be provided which address. In some cases the DNS record might also include a redirect address, which could indicate an address to which a customer/customer device should be directed if the content is unavailable. The DNS record can include any other appropriate fields as well.

In embodiments in which the DNS record is modified, when the DNS server receives a request (e.g., from a customer device via a customer service point) to resolve a domain name or hostname, the DNS server can determine, based on the identification of the customer (and/or customer service point) and the presence (or absence) of that identification in one of the customer lists, whether the resolved address should be the "above the drain" (i.e., Internet") address, or the "blow the drain" (i.e., localized content source) address. The DNS server then, can provide the selected address in response to the request.

It is appreciated that, in some cases, the modifications described above to a DNS server might not allow backwards compatibility with other network elements and/or clients that expect conventional DNS functionality. This issue can be resolved in multiple ways. Merely by way of example, in some cases, if the requesting client is not identified in any customer list, the DNS server might default to conventional behavior, in which the Internet address is provided to the requesting client. In other cases, the system might employ multiple DNS tables on a single DNS server, and/or multiple DNS servers, to service different types of clients. For example, DNS requests received from the Internet might be serviced with one table, while another table is used to service customers of the ISP; a third table might be used, for instance, for customer virtual private networks ("VPN") or private cloud instances. Policy decisions for any given customer could be stored one per customer, or even multiple policies per customer, e.g., based on the customer's location and/or the customer device being used to perform the request, such as a wireless phone vs. a set top box.

While examples are provided above, with respect to modification of running records, it should be appreciated that various embodiments can use any appropriate solution, including without limitation modification of route tables and/or DNS records, as described above, to achieve the modification of routing records. Thus, the described examples should be considered only illustrative in nature and do not limit the scope of various embodiments.

Returning to FIG. 2, at block 235, the method 200 comprises receiving, e.g., at the ISP network (or a network device therein), a request from the subscriber for the set of content. The request is routed (e.g., by the network device) in accordance with the updated routing records (block 240). For example, in an embodiment, the network device, such as a router, might receive request addressed to a content source. The address of the request might have been provided, for example, by a DNS server in response to a request from a customer service point, and the address provided by the DNS server might have been determined using the technique described above. In such a case, the router will route the request using conventional techniques on a route determined by that routers route tables. If the request pertains to content that the customer has specified should be obtained from an alternative source, the address will be associated with the alternative source, and the request will be routed to the alternative source. Conversely, if the request pertains to content that the customer has not indicated should come from an alternative source, the address will correspond to the Internet address of that source, and the request will be routed accordingly.

Alternatively, in a system in which route tables are modified, the router (or other network device) might receive a request addressed to the Internet address for the content, and the router might reroute that request, in accordance with a modified route table, to redirect the request to a localized content source, if the customer is specified that such content should be obtained from an alternative content source. In an aspect, customer identification may also be done off-board of the DNS or policy system by doing a "look up" of an IP address to a customer authentication database or other customer ID functional system.

The ISP network (and/or one or more devices therein, such as one or more network devices) delivers the set of content to the subscriber, in response to the request (block 245). In an aspect, delivering the content can comprise receiving the content from the content source (whether local or above the Internet drain) and routing the content to the residential gateway that requested the content (and/or, more specifically, to the residential gateway that serves the customer device that requested the content). In many cases, the content will be received and routed by the ISP network in conventional fashion (i.e., the content will comprise a plurality of IP packets addressed to the residential gateway, and the ISP network will route those packets conventionally), although this is not required.

In some cases, the method 200 further comprises, at block 250 accounting for delivering the set of content. In some cases, this accounting is based on the customer's selection of a content source for the content. Accounting for the content can comprise a number of different operations. Merely by way of example, in one embodiment, the ISP (or, more precisely, a billing system operated by the ASP) might build a subscriber one) content obtained through the Internet drain in another rate for content obtained from alternative source below the Internet drain. For instance, the ISP might build a subscriber a flat rate for content obtained from sources below the Internet drain and a per-bit rate (or the equivalent, such as a per-megabit rate etc.) for content obtained through the Internet drain. Alternatively, the ISP might bill the subscriber a first per-bit rate for content obtained through the Internet drain and a second (e.g., lower) per-bit rate for content obtained from an alternative source below the Internet drain. Alternatively and/or additionally, the ISP might bill the subscriber a monthly flat fee, which includes unlimited content from sources below the drain, with per-event flat rates additions each time content is obtained from above the Internet drain and/or per-bit charges for content obtained from above the Internet drain.

In another embodiment, accounting for delivering content might comprise subjecting content delivered from above the Internet drain to usage caps (such as a fixed number of bits over a particular period, such as a month, above which the ISP would not deliver any additional content from above the Internet drain and/or might charge additional fees for such content). In such cases, content obtained from alternative content sources below the Internet drain might be exempt from such usage caps. Alternatively and/or additionally, the ISP might subject content delivered from above the Internet drain to bandwidth restrictions (e.g., a particular number of bits per second), while content delivered from below the Internet drain might be exempt from such bandwidth restrictions.

In other cases, the system might provide a content provider portal for content providers to manage Internet content stored in the CDN (block 255). In an aspect, this portal might provide an interface for a content provider to upload content to the CDN and/or to assign an IP address and/or URL to content uploaded to the CDN. The content provider portal can provide other options as well. For instance, in some cases, the portal might allow providers to enable and/or disable redirection for their content, perhaps on an ad hoc and/or dynamic basis. In an aspect, this web portal can interface with a DNS server, router, etc. (or an intermediary computer that can provide such an interface) to effect the changes received from the content provider via the portal. For instance, in embodiment that employs modified DNS records, if a content provider accesses the portal to provide a URL and IP address for localized content, the Web portal might update the appropriate DNS record(s) to reflect the information provided by the content provider.

Figure 4:
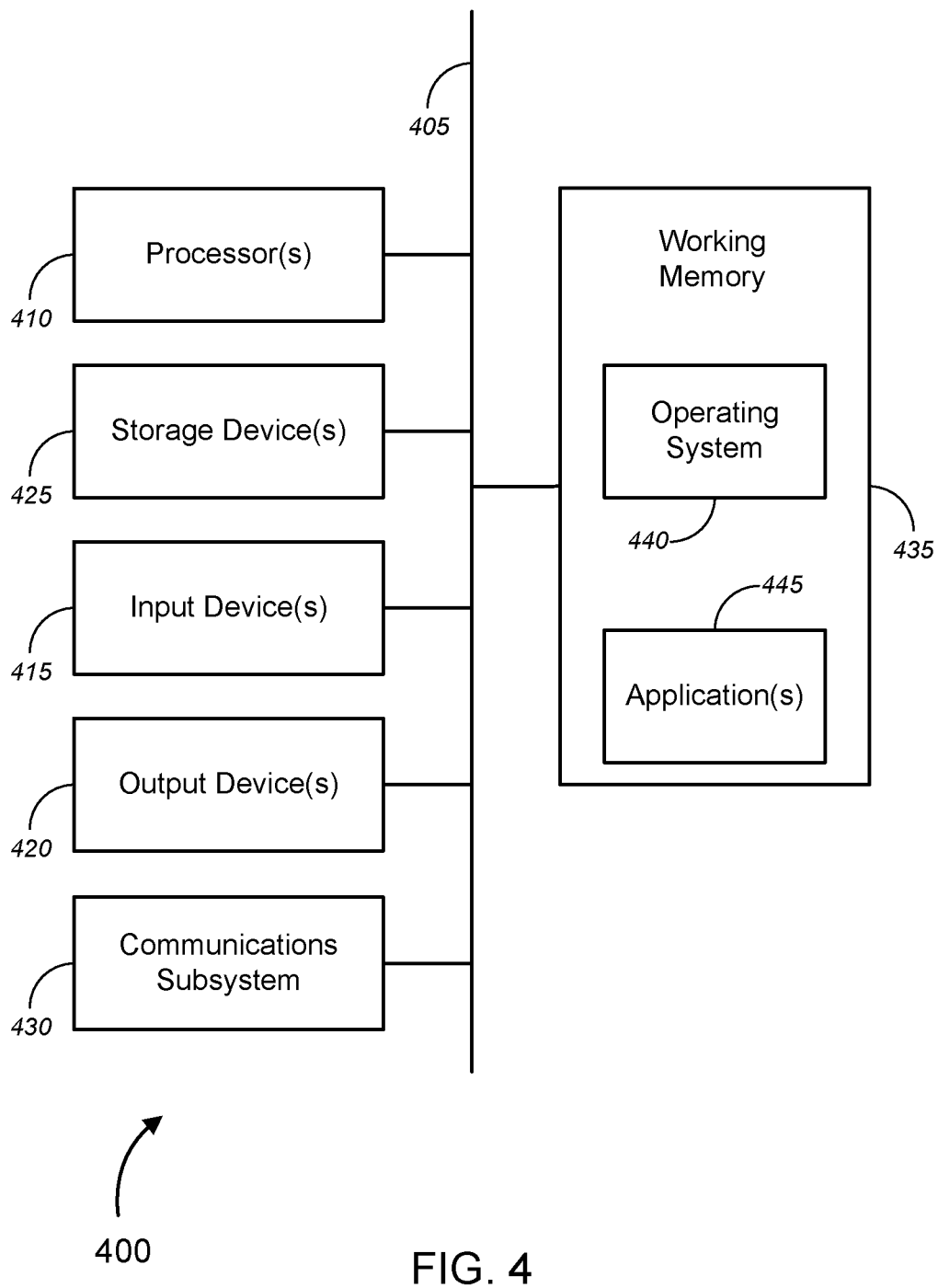
FIG. 4 is a generalized schematic diagram illustrating a computer system, in accordance with various embodiments.

FIG. 4 provides a schematic illustration of one embodiment of a computer system 400 that can perform the methods provided by various other embodiments, as described herein, and/or can function as a customer service point, residential gateway, monitoring device, customer device, and/or the like. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 430 may permit data to be exchanged with a network (such as the network described below, to name one example), with other computer systems, and/or with any other devices described herein. In many embodiments, the computer system 400 will further comprise a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operation in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 425. Volatile media includes, without limitation, dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, USB drive, a memory card, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. In a relationship between an Internet service provider ("ISP") and a subscriber, a system for delivering content, the system comprising:

a computer system in a customer service point computer in a residential gateway that provides connectivity between the subscriber and a network of the ISP, the computer system comprising:
one or more processors; and
a computer readable medium in communication with the one or more processors, the computer readable medium having encoded thereon a set of instructions executable by the computer system to:
provide an application programming interface ("API") for a video streaming system at a customer premise to select whether a set of Internet content should be obtained through an Internet drain of the ISP or from a content delivery network ("CDN") associated with the ISP; and
update one or more routing records within an ISP network to correspond with a subscriber's selection, so that requests from the subscriber are routed in accordance with the updated one or more routing records.

2. In a relationship between an Internet service provider ("ISP") and a subscriber, a method of delivering content, the method comprising:
providing, by a computer system in a customer service point computer in a residential gateway that provides connectivity between the subscriber and the ISP, a user interface for the subscriber to select whether a set of Internet content should be obtained through an Internet drain of the ISP or from a content delivery network ("CDN") associated with the ISP; and
updating one or more routing records within an ISP network to correspond with a subscriber's selection, so that requests from the subscriber are routed in accordance with the updated one or more routing records.

3. The method of claim 2, wherein the one or more routing records comprise one or more domain name system ("DNS") records on a DNS server.

4. The method of claim 3, wherein each of the one or more DNS records comprises a plurality of fields, the plurality of fields including at least one IP address associated with an Internet source of the set of Internet content, and at least one IP address associated with a CDN source of the set of Internet content.

5. The method of claim 4, wherein the plurality of fields further comprises a subscriber list field that identifies one or more subscribers that have selected to obtain the set of Internet content from the CDN.

6. The method of claim 2, wherein the one or more routing records comprise dynamic host configuration protocol ("DHCP") records on a DHCP server.

7. The method of claim 2, wherein the CDN is operated by the ISP.

8. The method of claim 2, wherein the CDN is operated by a third party and co-located within the ISP network.

9. The method of claim 2, wherein the CDN is outside the ISP network and operated by a third party having a peering arrangement with the ISP.

10. The method of claim 2, further comprising:
subjecting the set of Internet content to a first bandwidth restriction if the subscriber selects to obtain the set of Internet content through the Internet drain; and
exempting the set of Internet content to a second bandwidth restriction, or no bandwidth restriction, if the subscriber selects to obtain the set of Internet content from the CDN associated with the ISP.

11. The method of claim 2, wherein the user interface comprises a web portal.

12. The method of claim 2, wherein the user interface allows the subscriber to specify that some content should be obtained through the Internet drain of the ISP and that other content should be obtained from the CDN.

13. The method of claim 12, wherein the user interface provides the subscriber with an option to select, for each of a plurality of types of content, whether content of that type should be obtained through the Internet drain of the ISP or from the CDN associated with the ISP.

14. The method of claim 13, wherein the plurality of types of content comprises data files, streaming video, video game data, video chat, and instant messaging.

15. The method of claim 12, wherein the user interface provides the subscriber with an option to select, for each of a plurality of sources of content, whether Internet content from that source should be obtained through the Internet drain of the ISP or from the CDN associated with the ISP.

16. The method of claim 2, further comprising providing a content provider portal for a content provider to specify whether redirection is allowed for content from that content provider, wherein the content provider portal allows content providers to manage Internet content stored in the CDN.

17. The method of claim 16, wherein the content provider portal provides an interface for a content provider to upload content to the CDN and assign an IP address and URL to the content uploaded to the CDN.

18. The method of claim 2, further comprising:
receiving, from a customer device, customer-owned content; and
storing the customer-owned content at the CDN.

19. The method of claim 2, wherein the routing records are updated by the computer system in the customer service point in the residential gateway.

* * * * *